United States Patent
Eromäki

(10) Patent No.: US 6,619,356 B2
(45) Date of Patent: Sep. 16, 2003

(54) VEHICLE TIRE COMPRISING A MEANS FOR INDICATING THE TIRE POSITION IN THE SET OF TIRES OF A VEHICLE

(76) Inventor: Pentti Eromäki, Lerunkatu 14, FIN-37120 Nokia (FI)

( * ) Notice: Subject to any disclaimer, the term of this patent is extended or adjusted under 35 U.S.C. 154(b) by 113 days.

(21) Appl. No.: 09/956,777

(22) Filed: Sep. 19, 2001

(65) Prior Publication Data

US 2002/0046793 A1 Apr. 25, 2002

(30) Foreign Application Priority Data

Sep. 26, 2000 (FI) .............................................. 20002111

(51) Int. Cl.[7] .............................................. B60C 19/00
(52) U.S. Cl. ..................... 152/523; 152/154.2; 152/524
(58) Field of Search ...................... 152/154.2, DIG. 12, 152/523, 524

(56) References Cited

U.S. PATENT DOCUMENTS 3,578,054 A    5/1971  Boileau
4,317,479 A *  3/1982  McDonald
4,747,436 A    5/1988  Williams
2003/0037854 A1 * 2/2003  Suzuki

FOREIGN PATENT DOCUMENTS

| DE | 2640343    | * | 3/1978  |
| GB | 2272105    | * | 5/1994  |
| WO | WO 97/11011 | * | 3/1997  |
| WO | WO 97/50100 | * | 12/1997 |

* cited by examiner

*Primary Examiner*—Steven D. Maki
(74) *Attorney, Agent, or Firm*—Klarquist Sparkman LLP

(57) ABSTRACT

The present invention relates to a tire comprising a means for indicating the position of a tire among the set of tires of a vehicle. The means is a button, which is fitted in a recess made in the center of a pattern which illustrates the tire positions of the vehicle, so that the position of this particular tire among the set of tires of the vehicle can be indicated unambiguously by turning the button by means of the pattern on the button. The button has a groove and/or an embossment for turning the button by means of a screwdriver with a chisel head, a coin or a pair of pliers, for instance.

12 Claims, 3 Drawing Sheets

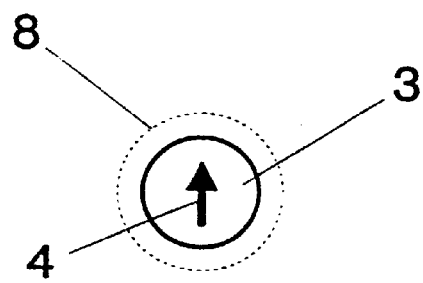
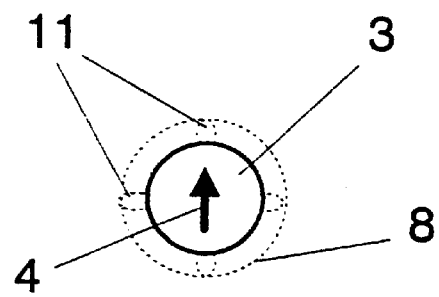
Fig. 5  Fig. 6
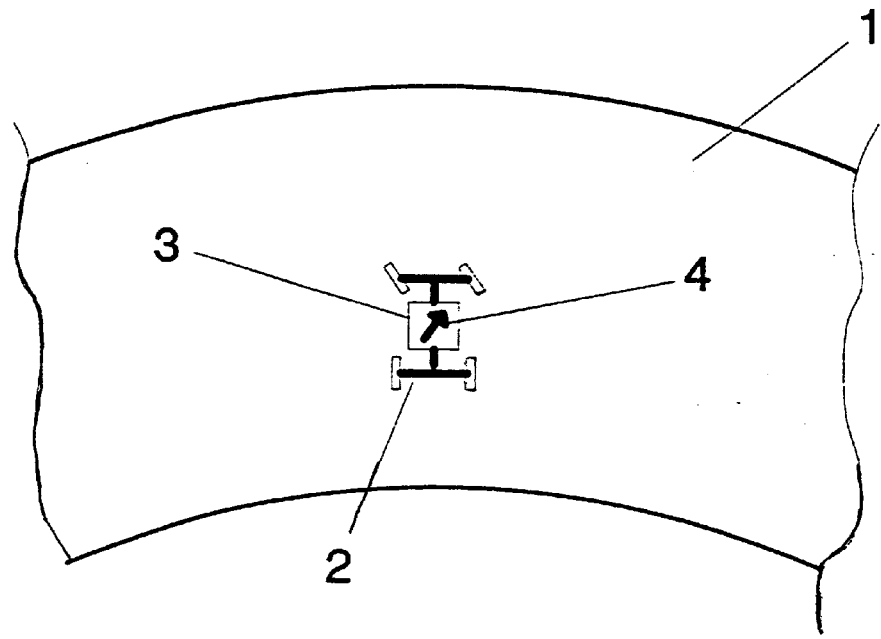
Fig. 7

VEHICLE TIRE COMPRISING A MEANS FOR INDICATING THE TIRE POSITION IN THE SET OF TIRES OF A VEHICLE

RELATED APPLICATION DATA

This application claims priority to Finnish patent application number 20002111, filed Sep. 26, 2000.

FIELD OF THE INVENTION

This invention relates to a vehicle tire and to indications made in the tire to show the position of this particular tire in the set of tires of the vehicle.

BACKGROUND

It is well known that, when summer tires are replaced with winter tires, or vice versa, an indication of the position of the replaced tire among the set of tires has preferably been made on the side of the tire, for the tire to be fitted in the same place next time it is used. This indication has conventionally been made by pencil on the side of the tire or the rim (e.g., OT=RR right-hand rear tire). An optional manner is to glue a piece of painter's masking tape to the tire side, indicating the position among the tires of the vehicle.

However, the typically black rubber surface of the tire does not provide an optimal background for the indication to be discerned, and pieces of painter's tape tend to come off, since the tire surface is often fouled after use and thus has a poor adhesive surface. The traces of typically available indicating means are poorly discernable from the remaining tire surface; with the exception of felt-tip pens or chalks that leave a light trace (e.g., silvery or white). Then again, these marks made with felt-tip pens or chalks are inconvenient as the set of tires are rotated under the car to even out their wear. Old marks are not always easy to remove completely. If, again, the mark has not been made properly, it may disappear during the storage of the tires. The absence of indicating means available when the tires are being replaced causes another problem, and then this marking, which is quite essential as such, is not done at all, and the tires may be completely in disorder when fitted in the car next time.

This invention brings a solution to the problems described above. The invention and its preferred embodiments are characterized by the features defined in the claims below.

SUMMARY

The inventive idea is to provide the tire side with a surface pattern, preferably an embossed pattern, which unambiguously illustrates the tire positions of the vehicle, and to fit a circular and turnable button of, e.g., plastic in a recess located in the center or in the vicinity of the embossment. An optional shape of the button is a square, allowing the button to be withdrawn from the recess and refitted in the correct position.

The button comprises a pattern, preferably an arrow pattern, which indicates the position of the particular tire in the tire position embossment. The straight portion of the arrow consists of a groove and/or an embossment in the button, and the bent end portion consists of, e.g., a drawing, a relief or a recess. The button remains fixed in the tire owing to the recess in the tire or to the shape of the button. The options for performing the attachment are almost infinite. One preferred shape of the button and the recess is a conical shape that flares out as it penetrates deeper into the tire surface. However, it is preferable that the button is securely retained in the tire and that it can be moved whenever necessary, for instance, by rotating or by detaching and subsequently reattaching.

The position of a tire in the set of tires of the vehicle is determined by turning the button, which is embedded in the recess of the tire, using the groove or the embossment, with, for instance, a screwdriver with a chisel head, a coin edge or a pair of pliers, to the desired position, with the point of the arrow pattern in the button pointing at the tire position embossment surrounding it and determining the position of the tire among the set of tires. In this manner, the tire "remembers" its position among the set of tires during storage and, should the positions be rotated in order to even out tire wear, the "memory" can readily be updated to the new fitting position.

When a button having some other shape than circular is being used, the button should first be removed from the recess and then be refitted in the correct position in the recess.

The invention eliminates the need for the provision of any special indicating means during the replacement of tires and, with the solution of the invention, there is no risk of the mark being effaced from the tire.

BRIEF DESCRIPTION OF THE DRAWINGS

The invention is described below with a number of preferred embodiments and with reference to the drawings, in which

FIGS. 5 and 6 are top views of preferred embodiments of the button;

FIG. 7 shows another embodiment of the button of FIGS. 1–6.

DETAILED DESCRIPTION

Figure 1:
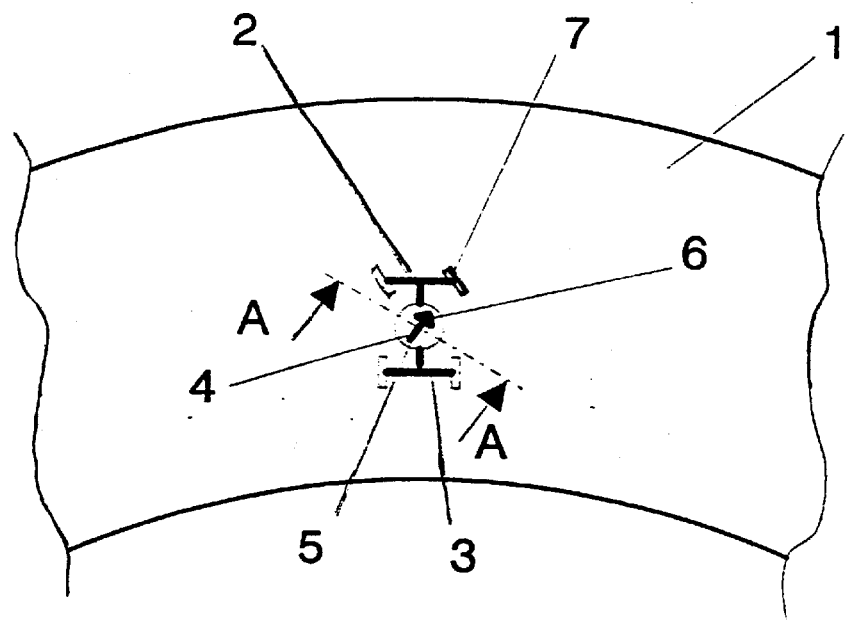
FIG. 1 is a side view of a part of a vehicle tire.

FIG. 1 is a side view of part of the tire 1 of a vehicle. It has been provided with a surface pattern, which illustrates the positions of the set of tires of the vehicle and which preferably is an embossment 2. This embossment 2 shows the positions of the tires of the vehicle without ambiguity. A button 3 has been embedded in the center of the embossment 2, with the button surface flush with the outer surface of the tire 1. On its surface, the button 3 has a pattern, which preferably is an arrow pattern. The arrow pattern 4 consists of a straight portion 5 and a bent end portion 6. The straight portion 5 of the arrow pattern 4 has been given a shape such that allows the button 3 to be turned in the recess of the tire 1 whenever necessary. By turning the button 3, the point 6 of the arrow pattern 4 is rotated to point at the desired tire in the tire position embossment 2 and, thus, the position of this particular tire 1 is identified among the set of tires of the vehicle. In this example, the arrow pattern 4 points at the right-hand front tire 7 of the embossment 2 illustrating the tire positions.

Figure 2:
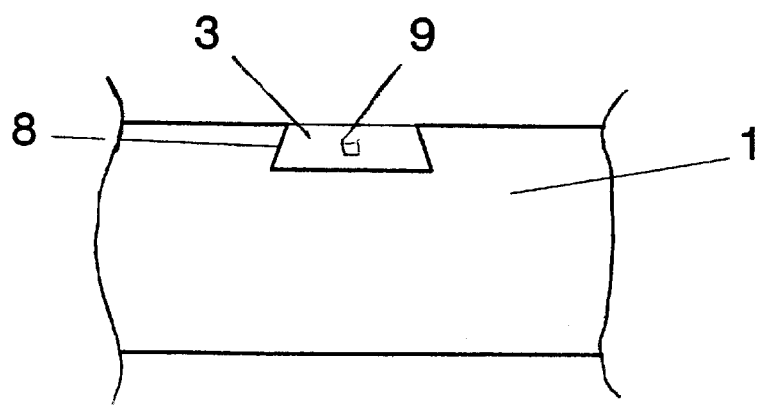
FIG. 2 shows a preferred embodiment of FIG. 1 in section A—A.

FIG. 2 illustrates a preferred embodiment of FIG. 1 in section A—A. The button 3 is embedded in a recess 8 made in the surface of the tire 1. The conical shapes of the recess 8 and the edges of the button 3 retain the button in place, while allowing its free rotation when necessary. The button 3 can be rotated from the groove 9 forming the straight portion 5 of the arrow pattern 4 by means of a screwdriver with a chisel head, or a coin, for instance. A sufficiently tight fit between the button 3 and the recess 8 in the tire ensures that the button cannot come off by itself, nor turn in the recess.

Figure 3:
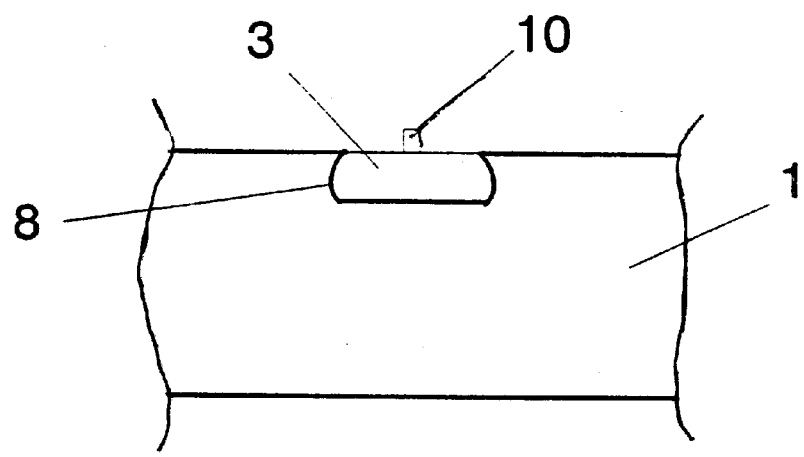
FIGS. 3 and 4 show a number of other preferred embodiments of FIG. 1 in section A—A.

FIG. 3 shows another embodiment of FIG. 1 in section A—A. In this case, the design of the recess 8 and the edges of the button 3 have been carried out with a curved shape. In addition, the straight portion 5 of the arrow pattern 4 is formed by the embossment 10. The button 3 can be turned to the desired position by gripping this embossment 10 with a pair of pliers, for instance.

The design of the recess 8 and the button 3 may also be such that the lower edge of the button comprises, e.g., a collar-like expansion, which engages a groove made at the bottom of the recess and, thus, retains the button in the tire. Other options for fixing the button 3 to the tire 1 are conceivable. It is essential that the button 3 at some point is substantially larger than the mouth of the recess 8, allowing engagement with the tire 1. The button 3 may also simultaneously comprise both the options above, not only a groove 9 but also an embossment 10, for the button to be turned into the desired position.

Figure 4:
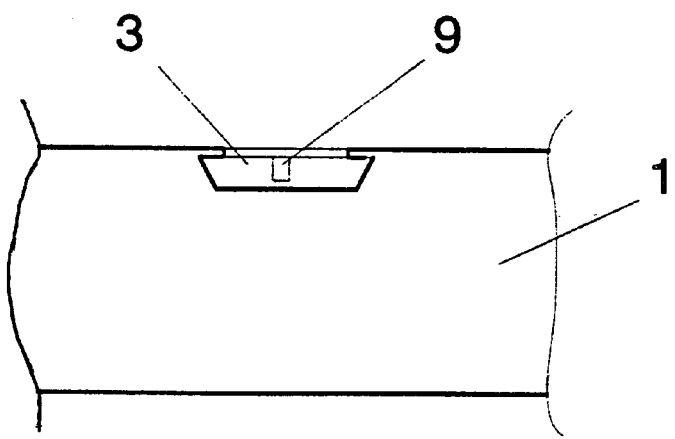

FIGS. 4, 5 and 6 show a number of other optional designs of the button. In FIG. 4, the surface of the button 3 is located on a slightly lower level than the surface of the side of the tire 1, and the conical shape of the button has been carried out inversely to that of FIG. 2. The button 3 in FIG. 5 fills the recess 8 in the tire completely, whereas the button in FIG. 6 has four projections 11, which retain the button 3 in position in the recess 8 of the tire.

FIG. 7 shows a second preferred shape of the button 3 in the tire 1. Here, the button 3 is square, and it can be removed from and refitted in the recess when it is desirable to change the position of the indicator 4 relative to the tire position embossment 2.

The examples above merely illustrate a number of preferred embodiments of the present invention. The examples are by no means restrictive but, in contrast, the preferred embodiments of the invention can be varied without departing from the inventive idea defined in the following claims.

I claim:

1. A vehicle tire, comprising a tire position pattern of a vehicle on a surface of the tire and a rotatable means in a recess in a center of the tire position pattern, the rotatable means comprising an indicator to point out a position of a particular tire among a set of tires of the vehicle in the tire position pattern which surrounds the rotatable means and illustrates the tire positions of the vehicle.

2. A tire as defined in claim 1, wherein the rotatable means comprises a disc-shaped button and a groove and/or an embossment pattern for turning the button.

3. A tire as defined in claim 1, wherein the means includes a button which is angular and can be turned by detaching and reattaching so that the indicator points at the particular tire in the tire position pattern of the vehicle.

4. A tire as defined in claim 2, wherein the button is at least at some point substantially larger than the mouth of the recess in the tire so that the button is retained in the recess in the tire.

5. A tire as defined in claim 4, wherein the tire position pattern of the vehicle is an embossed pattern.

6. A tire as defined in claim 1, characterized in that the tire position pattern of the vehicle is an embossed pattern on the side of the tire.

7. A vehicle tire, comprising:
   a side wall of the vehicle tire, the side wall having a recess therein;
   a graphical pattern on the side wall of the tire adjacent to the recess in the vehicle tire, the graphical pattern illustrating positions of a set of tires on a vehicle; and
   a turnable button positioned within the recess of the side wall, the turnable button having an indicator that is pointable to any one of the set of tires in the graphical pattern.

8. The vehicle tire of claim 7, wherein the graphical pattern is an embossed pattern.

9. The tire as defined in claim 7, wherein the turnable button comprises a disc-shaped button.

10. A tire as defined in claim 7, wherein the button is angular and can be turned by detaching and reattaching so that the indicator points to any one of the set of tires in the graphical pattern.

11. A tire as defined in claim 7, wherein the button is at least at some point substantially larger than a mouth of the recess so that the button is retained in the recess in the tire.

12. A tire as defined in claim 7, wherein the turnable button is in a center of the graphical pattern.

* * * * *